United States Patent
Dmitriev et al.

(10) Patent No.: US 10,989,815 B2
(45) Date of Patent: Apr. 27, 2021

(54) METHOD FOR POSITIONING UNDERWATER OBJECTS AND SYSTEM FOR THE IMPLEMENTATION THEREOF

(71) Applicant: UNDERWATER COMMUNICATIONS & NAVIGATION LABORATORY (LIMITED LIABILITY COMPANY), Moscow (RU)

(72) Inventors: Stanislav Mikhailovich Dmitriev, Volgograd (RU); Alexander Vasilievich Dikarev, Volgograd (RU)

(73) Assignee: UNDERWATER COMMUNICATIONS & NAVIGATION LABORATORY (LIMITED LIABILITY COMPANY), Moscow (RU)

( * ) Notice: Subject to any disclaimer, the term of this patent is extended or adjusted under 35 U.S.C. 154(b) by 192 days.

(21) Appl. No.: 15/758,418

(22) PCT Filed: Sep. 6, 2016

(86) PCT No.: PCT/RU2016/050029
§ 371 (c)(1),
(2) Date: Apr. 9, 2018

(87) PCT Pub. No.: WO2017/044012
PCT Pub. Date: Mar. 16, 2017

(65) Prior Publication Data
US 2018/0252820 A1    Sep. 6, 2018

(30) Foreign Application Priority Data

Sep. 8, 2015   (RU) ............................ RU2015138268

(51) Int. Cl.
*G01S 19/45*   (2010.01)
*G01S 19/48*   (2010.01)
(Continued)

(52) U.S. Cl.
CPC .............. *G01S 19/45* (2013.01); *G01S 19/48* (2013.01); *G01C 21/00* (2013.01); *G01S 1/80* (2013.01);
(Continued)

(58) Field of Classification Search
CPC ........ G01S 19/45; G01S 19/48; G01S 5/0072; G01S 5/26; G01S 5/30; G01S 1/80; G01C 21/00; B63B 22/00; B63C 7/26
(Continued)

(56) References Cited

U.S. PATENT DOCUMENTS 4,070,671 A * 1/1978 Morrow .................... G01S 5/26
                                                                    367/6
5,113,341 A    5/1992 Kozol et al.
(Continued)

FOREIGN PATENT DOCUMENTS

RO    129 075 B1    5/2015
RU   2 303 275 C2    7/2007
(Continued)

OTHER PUBLICATIONS

International Search Report and Written Opinion dated Nov. 17, 2016 issued in corresponding application No. PCT/RU2016/050029; w/ English translation (10 pages).
(Continued)

*Primary Examiner* — Chuong P Nguyen
(74) *Attorney, Agent, or Firm* — Seckel IP, PLLC

(57) ABSTRACT

The present group of inventions relates to methods and systems for positioning underwater objects, and more par-
(Continued)

ticularly to methods and systems in which satellite signals are received by receivers disposed on sonar buoys, the coordinates of the sonar buoys are determined by means of computation modules on the sonar buoys, location data and identification data are transmitted in the form of sonar signals emitted by transmitters on the sonar buoys, the signals are received with the aid of a receiver disposed on an underwater object, and the coordinates of the underwater object are determined according to the time delay of receipt of the sonar signals from the sonar buoys, the location of which is known. The present solution can be used in simultaneously determining the geographical position of an unlimited number of mobile underwater objects, remotely operated underwater vehicles, divers, marine animals, etc. in motion. According to the invention, signals from the aforementioned sonar buoys are encoded in the form of periodic signals tethered to GPS/GLONASS clocks, all transmitters of the sonar signals are disposed at the same depth, and during decoding of the signals from the sonar buoys, direct signals from the sonar buoys are isolated from reflected signals. The system implements the aforementioned method. The achieved technical result is more accurate positioning of the underwater objects.

12 Claims, 2 Drawing Sheets

(51) Int. Cl.
| | |
|---|---|
| G01C 21/00 | (2006.01) |
| G01S 5/00 | (2006.01) |
| G01S 5/28 | (2006.01) |
| G01S 1/80 | (2006.01) |
| G01S 5/26 | (2006.01) |
| G01S 5/30 | (2006.01) |

(52) U.S. Cl.
CPC ............. *G01S 5/0072* (2013.01); *G01S 5/26* (2013.01); *G01S 5/28* (2013.01); *G01S 5/30* (2013.01)

(58) Field of Classification Search
USPC ............. 342/357.28, 357.31, 450; 441/11; 340/850
See application file for complete search history.

(56) References Cited

U.S. PATENT DOCUMENTS

| | | | | |
|---|---|---|---|---|
| 5,119,341 | A * | 6/1992 | Youngberg | G01S 5/0009 367/5 |
| 5,331,602 | A * | 7/1994 | McLaren | G01S 5/0009 367/127 |
| 5,579,285 | A * | 11/1996 | Hubert | G01S 5/0009 367/133 |
| 6,657,585 | B1 * | 12/2003 | Kucik | G01S 19/14 342/357.44 |
| 7,272,074 | B2 * | 9/2007 | Basilico | G01S 1/72 367/128 |
| 7,512,036 | B2 * | 3/2009 | Crowell | H04B 11/00 367/127 |
| 7,760,587 | B2 * | 7/2010 | Abbot | G01S 11/14 367/131 |
| 7,969,822 | B2 * | 6/2011 | Basilico | G01S 1/72 367/128 |
| 8,009,516 | B2 * | 8/2011 | Crowell | G01S 5/30 367/128 |
| 9,432,129 | B2 * | 8/2016 | Gosling | G01S 5/0009 |
| 10,379,218 | B1 * | 8/2019 | Spiesberger | G01S 15/58 |
| 10,551,473 | B2 * | 2/2020 | Jukkala | G01S 5/30 |
| 2004/0116145 | A1 * | 6/2004 | Smolyar | H04W 52/12 455/524 |
| 2006/0224352 | A1 * | 10/2006 | Baer | G01C 21/12 702/150 |
| 2008/0037370 | A1 | 2/2008 | Crowell | |
| 2008/0165617 | A1 * | 7/2008 | Abbot | G01S 15/876 367/3 |
| 2009/0196122 | A1 | 8/2009 | Crowell | |
| 2009/0316522 | A1 * | 12/2009 | Sato | B63G 8/39 367/5 |
| 2015/0124565 | A1 | 5/2015 | Gosling et al. | |
| 2016/0259029 | A1 * | 9/2016 | Jukkala | B63C 11/02 |
| 2017/0067993 | A1 * | 3/2017 | Crowell | G01S 15/66 |
| 2019/0185122 | A1 * | 6/2019 | Hamme | G01S 15/74 |
| 2020/0180740 | A1 * | 6/2020 | Christ | G05D 1/0027 |

FOREIGN PATENT DOCUMENTS

| | | | |
|---|---|---|---|
| RU | 2 437 114 C1 | 12/2011 | |
| RU | 2 561 012 C1 | 8/2015 | |
| WO | 2007/022233 A2 | 2/2007 | |
| WO | WO-2013024258 A1 * | 2/2013 | ............. B63B 22/00 |
| WO | 2013/128187 A1 | 9/2013 | |

OTHER PUBLICATIONS

Supplementary European Search Report and Written Opinion dated Apr. 4, 2019 in counterpart application No. EP16844796; in English (7 pages).

* cited by examiner

METHOD FOR POSITIONING UNDERWATER OBJECTS AND SYSTEM FOR THE IMPLEMENTATION THEREOF

TECHNICAL FIELD OF INVENTION

The present group of inventions relates to methods and systems for positioning underwater objects, and more particularly to methods and systems in which satellite signals are received by receivers disposed on sonar buoys, the coordinates of the sonar buoys are determined by means of computation modules on the sonar buoys, location data and identification data are transmitted in the form of sonar signals emitted by transmitters on the sonar buoys, the signals are received with the aid of a receiver disposed on an underwater object, and the coordinates of the underwater object are determined according to the time delay of receipt of the sonar signals from the sonar buoys, the location of which is known. The present solution can be used in simultaneously determining the geographical position of an unlimited number of mobile underwater objects, remotely operated underwater vehicles, divers, marine animals, etc. in motion.

Following terms are used in the present description:

Sonar buoy, which is a free floating or anchored buoy designed to emit and/or receive and relay sonar signals using a radio channel.

Rake is a receiver that allows to identify individual reflections and select the earliest of them to determine the time of receipt under a multipath propagation of the sonar signals. The multipath propagation is an effect encountered during a propagation of sonar signals. It emerges when the point of receipt collects not only a direct ray but one or more reflected rays. In other words, the receiver's antenna receives not only direct rays (directly from the source), but also reflected rays (from a bottom, a water interface and other objects). Under multipath propagation, the signals received from a number of paths are insufficiently correlated. To ensure that multipath components with the time shift were shown separately in the receiver's line filter output, it is necessary that the filter's response to each component of the signal was shorter compared to their mutual time shift. A matched filter works better as a receiver filter as its response to the signal is the signal's ACF (autocorrelation function). Signals with a sharp ACF are better suited for separation of multipath components. Therefore, broadband signals are used for multipath diversity, as the signal has a longer length but is then shortened by the filter. A signal distorted by a multipath channel (a) is transmitted to the matched filter and, if it is synthesized correctly, the filter output shows the components as sharp non-overlapping peaks. These peaks look similar to a garden rake, so the device designed for multipath diversity is called a rake receiver (or a distributed to signal receiver).

PRIOR ART OF THE METHOD

Known methods for positioning underwater objects rely on determining the coordinates (positioning) of underwater objects. These terms are used as synonyms. The known examples of prior art include three types of systems for positioning underwater objects by their sonar signals differing from each other by their baseline, said size being the distance between sonar antennae. These systems are USBL (ultra-short baseline), SBL (short baseline) and LBL (long baseline). Long baseline systems are the closest to the essence of the claimed solution, however, this invention offers a synthesis of a short baseline and a long baseline systems wherein reference points (sonar buoys) are located far from each other forming a long baseline, but the location of a positioned object is determined by a time difference method which is mostly used in short baseline systems.

The advantages of such method are, firstly, an option to position an unlimited quantity of objects at the same time, and, secondly, an option to use the fully passive mode for an object being positioned, wherein, it will have only to receive signals from sonar buoys and decode the coordinates of sonar buoys and signals to determine its proper geographical location by time difference between the signals received.

A known example of prior art includes the invention "Method and device for monitoring and remote control of unmanned, mobile underwater vehicles", U.S. Pat. No. 5,579,285, IPC G01S 5/00, G01S 5/14, G01S 11/14, published on Aug. 21, 1995, wherein floating sonar buoys are positioned at various points on the sea surface to form a long baseline. Each such sonar buoy is equipped with a receiver of the global satellite positioning system (GPS/GLONASS), a clock synchronized with the GPS clock, a sonar receiver system with a submerged signal converter, and a radio modem. Such devices are called GIB (Global Intelligent Buoy). Each sonar buoy measures its own coordinates and time of arrival (TOA) of signals from underwater objects and transmits these data via the radio modem to an accompanying vessel or a ground control station at predefined intervals. The sonar transmitter of the underwater object periodically emits a signal at predefined intervals. Distances from the underwater object to buoys are calculated taking into account the received TOA data and a water sound velocity. The coordinates of the underwater objects are calculated and displayed using a known algorithm.

Advantages of the above method:
no finetuning of baselines is required because the coordinates of the buoys are registered by the global satellite positioning system transceiver; as a result, the error in determination of coordinates due to inaccurate installation of sonar buoys is mitigated;
the amount of data transmitted via a sonar channel is dramatically reduced due to the fact that only the transmitter located on the underwater object emits signals.

Drawbacks of the above method:
unanchored (floating sonar buoys) may change its mutual arrangement; there is also a possibility of adverse mutual arrangement (for example, when an object being positioned and several sonar buoys line up);
operation with several objects being positioned at the same time with possibly interfering signals and ability to dramatically degrade the conditions of sonar buoys receiving is practically impossible or impaired.
determination of TOA (time of arrival) by the edge of the signal at low signal-to-interference ratio and/or TOA determination ambiguity due to multiple reflections and/or useful signal drowning by the noise, as inherent in multipath diversity.

Another known example of prior art is the invention "System for determining coordinates of underwater objects", patent RU 2437114, published on Dec. 20, 2011, wherein a method of correlation reception is proposed for determination of TOA instead of using the edge of the signal for that purpose, said method allowing for better TOA determination at low signal-to-interference ratio and multipath transmission of the signal in the medium.

However, this invention does not solve the problem of simultaneous positioning of several objects.

The present invention, on the one hand, relates to a method for positioning underwater objects, in which
   satellite signals are received by receivers disposed on sonar buoys,
   the coordinates of the sonar buoys are determined by means of computation modules of the sonar buoys,
   location data of the aforementioned sonar buoys and their identification data are transmitted in the form of sonar signals emitted by transmitters of the sonar buoys,
   the signals are received with the aid of a receiver of the sonar signals, said receiver being disposed on an underwater object,
   the coordinates of the underwater object are determined by means of computation modules of the underwater object according to a time delay of receipt of the sonar signals from the sonar buoys, the location of which is known.

This method is described in the U.S. Pat. No. 5,119,341, published in 1992.

The above method is the closest to the essence and technical result of the claimed invention and is assumed herein as a prototype of the claimed invention as a method.

The drawback of the prototype is insufficient accuracy of positioning, or determination of coordinates of the underwater objects, due to:
   there is a computation of all three volume coordinates, i.e. longitude, latitude and depth, which complicates the calculations and imposes additional load on the computing processor and creates room for errors,
   signals may interfere with each other and create distortions incompatible with correct positioning,
   direct signals may be replaced by signals from sonar buoys reflected from the bottom, which introduces errors in positioning.

DISCLOSURE OF THE INVENTION AS A METHOD

The present invention relies on this novel observation with the primary aim to offer a method for positioning underwater objects that serves at least to mitigate one of the aforementioned drawbacks, namely, to improve the accuracy of positioning underwater objects.

For the purpose of reaching the above objective, the method for positioning underwater objects is characterized, in essence, by inclusion of the following additional steps:
   the signals from the aforementioned sonar buoys are encoded as periodic signals tethered to GPS/GLONASS clocks,
   all transmitters of the sonar signals are installed at the same depth,
   during decoding of the signals from the sonar buoys, direct signals from the sonar buoys are isolated from reflected signals.

These useful features make it possible to improve the accuracy of positioning by separating the signals and ensuring that only direct signals are processed. Furthermore, the method allows to simplify all calculations due to the fact that outcoming signals are emitted strictly at the same depth, which reduces a margin for calculation errors, accelerates the calculation process and reduces the load on the computation module of the underwater object. During positioning of the underwater object, only its latitude and longitude is to determined, while depth is evaluated using a temperature compensated depth sensor. At the same time, the communication signal emitted by sonar buoys to transmit their coordinates, is a positioning signal used by the receivers to determine the time of arrival. The method also makes it possible to separate individual signal reflections for better determination of the time of arrival by the earliest incoming ray, selecting the earliest signals to establish the time of arrival.

Signals from the sonar buoys are separated by time for the following reasons: acoustic channel is very bad, information-wise, because the band is narrow, and there is a big difference is signal transmission at different frequencies. Even encoded and separated, two signals transmitted at the same frequency can produce interference to each other, in real life it renders the positioning system completely non-operational and prohibits the user from determining the coordinates of an underwater object.

There is a version of the invention wherein during encoding the signals are divided by frequency and separated by time delay. This useful feature makes it possible to separate signals from different sonar buoys from each other and eliminate errors.

A combination of the essential features of the claimed invention is unknown from the prior art, therefore the invention as a method possesses a required criterion of novelty. Furthermore, the above solution is not evident to those skilled in the art.

PRIOR ART OF THE SYSTEM

The present invention, on the other hand, relates to a system for positioning underwater objects, said system comprising sonar buoys having a receiver for satellite signals, said receivers being connected to a computation module of the sonar buoys, said modules being connected to a sonar signal transmitter of sonar signals which comprise location data of the aforementioned sonar buoys and their identification data, said system also it comprising a receiver of the sonar signals from the aforementioned sonar buoys, said receiver being disposed on an underwater object and connected to a computation module of the underwater object, said computation module being adjusted so as to determine the coordinates of the underwater object by the time delay of arrival of the sonar signals from the sonar buoys, the location of which is known.

This system is described in the U.S. Pat. No. 5,113,341, published in 1992.

The above system is the closest to the essence and technical result of the claimed invention and is assumed herein as a prototype of the claimed invention as a device.

The drawback of the prototype is insufficient accuracy of positioning of the underwater objects, due to:
   there is a computation of all three volume coordinates, i.e. longitude, latitude and depth, which complicates the calculations and imposes additional load on the computing processor and creates room for errors,
   signals may interfere with each other and create distortions incompatible with correct positioning,
   direct signals may be replaced by signals from sonar buoys reflected from the bottom, which introduces errors in positioning.

DISCLOSURE OF THE INVENTION AS A SYSTEM

The present invention offers a system for positioning underwater objects that serves at least to mitigate one of the aforementioned drawbacks, namely, to improve the accuracy of positioning underwater objects.

For the purpose of reaching the above objective, each sonar buoy comprises a unit for encoding of signals connected to the sonar buoy's computation module and adjusted so as to generate an encoded periodic signal tethered to GPS/GLONASS clocks, at the same time, all transmitters of the sonar signals are installed at the same depth, and each receiver of the sonar signals from the aforementioned sonar buoys has a decoding unit of signals from the sonar buoys, said decoding unit being connected to a module for isolating direct signals of the sonar buoys from reflected signals and for registering the time of arrival of the direct signal only, each module for isolating direct signals of the sonar buoys from reflected ones being made as a rake receiver.

These useful features make it possible to improve the accuracy of positioning by separating the signals and ensuring that only direct signals are processed. At the same time, a communication signal emitted by the sonar buoys to transmit their coordinates, is a positioning signal used by the receivers to determine the time of arrival. The system makes use of the rake receivers to allow to isolate individual signal reflections for better determination of the time of arrival by the earliest incoming ray, selecting the earliest signals to establish the time of arrival.

There is a version of the invention wherein each unit for encoding of signals is adjusted so as to generate periodic encoded signals which are divided by frequency and separated by time delay. This useful feature makes it possible to separate signals from different sonar buoys from each other and eliminate errors.

There is another version of the invention wherein each receiver of the sonar signals from the aforementioned sonar buoys has a temperature compensated depth sensor.

This useful feature makes it possible to simplify all calculations due to the fact that outcoming signals are emitted strictly at the same depth, which reduces a margin for calculation errors, accelerates the calculation process and reduces a load on the computation module of the underwater object. During positioning of the underwater object, only its latitude and longitude is determined, while depth is evaluated using a temperature compensated depth sensor.

A combination of the essential features of the claimed invention as a device is unknown from the prior art, therefore the invention as a device possesses a required criterion of novelty.

BRIEF DESCRIPTION OF DRAWINGS

Other distinguishing features and advantages of the group of inventions are readily apparent from the description below which includes but is not limited to the following features, with reference to the figures attached on which.

Figure 1:
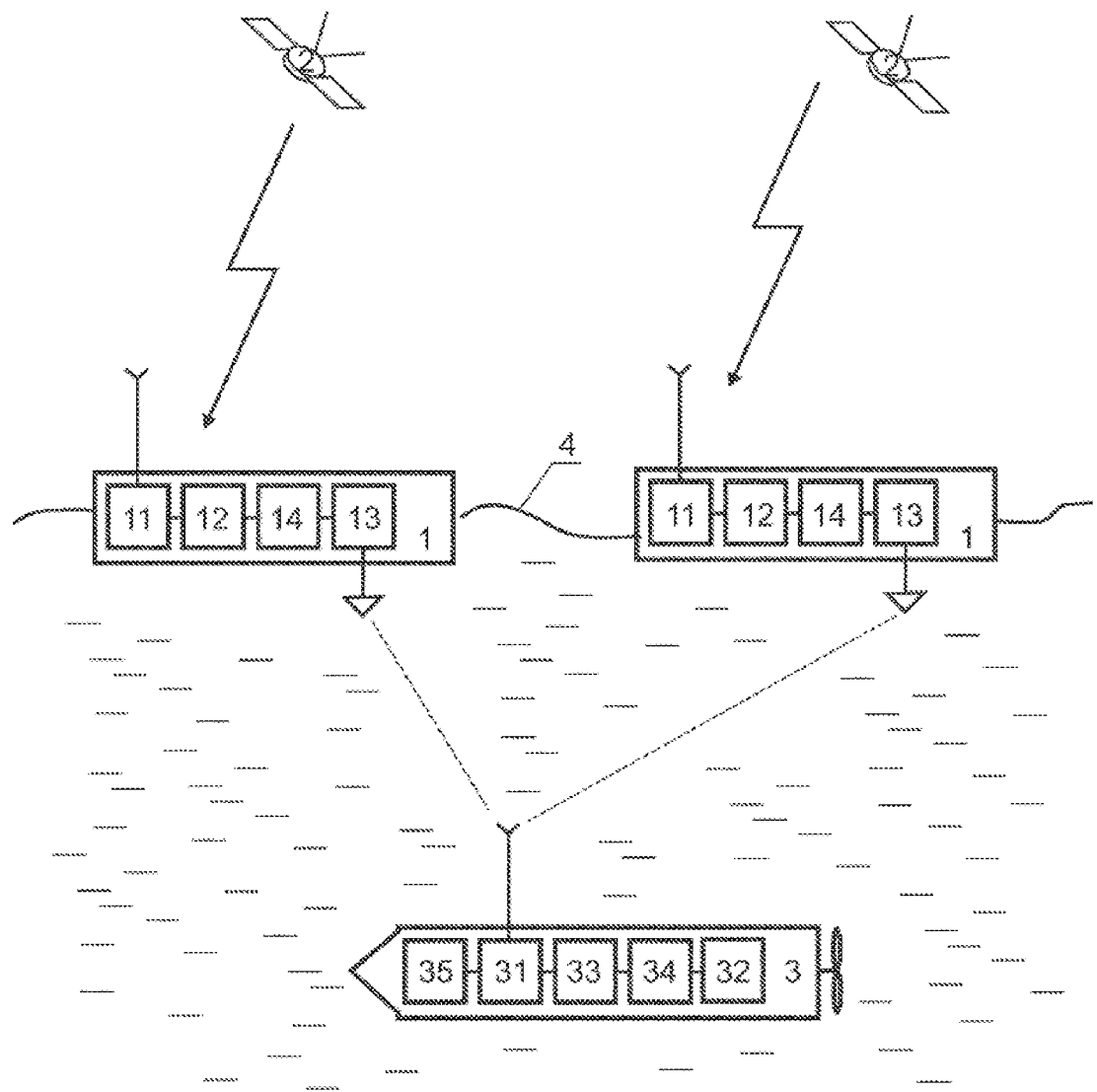
FIG. 1 represents a functional diagram of a system for positioning underwater objects according to the invention.

According to the FIG. 1, a system for positioning underwater objects includes sonar buoys 1, said buoys having a receiver 11 for satellite 2 signals, said receiver being connected to a computation module 12 of the sonar buoy, said module being connected to a transmitter 13 of sonar signals, said signals comprising location data of the aforementioned sonar buoys and their identification data. The system also comprising a receiver 31 of the sonar signals from the sonar buoys 1, said receiver being disposed on an underwater object and connected to a computation module 32 of the underwater object, said computation module being adjusted so as to determine the coordinates of the underwater object by the time delay of arrival of the sonar signals from the sonar buoys 1, the location of which is known.

Each sonar buoy 1 comprises a unit 14 for encoding of signals connected to the sonar buoy's computation module 12 and adjusted so as to generate an encoded periodic signal tethered to GPS/GLONASS clocks. All transmitters 13 of the sonar signals are installed at the same depth. Each receiver 31 of the sonar signals from the aforementioned sonar buoys has a it decoding unit 33 of signals from the sonar buoys, said decoding unit being connected to a module 34 for isolating direct signals of the sonar buoys from reflected signals and for time of arrival of the direct signal only. Each module 34 for isolating direct signals of the sonar buoys from reflected ones is made as a rake receiver.

Each unit 14 for encoding of signals may be adjusted so as to generate periodic encoded signals which are divided by frequency and separated by time delay.

Each receiver 31 of the sonar signals from the aforementioned sonar buoys may have a temperature compensated depth sensor 35.

Three sonar buoys 1 may be used into the system. However, these three sonar buoys is a theoretical minimum: as hyperbolic positioning relies on differences in times of arrival, a so-called "asymptotic operation" is widespread, or a situation where the differences in times of arrival tend towards zero, and an objective function to be optimized has a multitude of false minimums. To avoid this situation, a variant of the system involving four sonar buoys is proposed. The fourth sonar buoys allows to rectify the situation in a number of cases (A system of five sonar buoys may be used, but it would be unreasonable as there will be no significant improvement in accuracy, while the complexity of installation, the total size of system, etc. will increase).

The communication range in the proposed system is determined by a central frequency and may equal 3000 meters, i.e. sonar buoys may be installed no farther than 1500 meters away from each other. The system proposed implies performing all positioning operations between these buoys, considering that current underwater activities rely on a much smaller water area.

The position 4 in the FIG. 1 indicates a boundary between the liquid media and the atmosphere, while the dotted line shows a transmission of signals from sonar buoys to the receiver of the underwater object.

EMBODIMENT OF THE INVENTION

The system for positioning underwater objects operates as follows. The most exhaustive, but non-limiting example of embodiment of the invention is provided.

Figure 2:
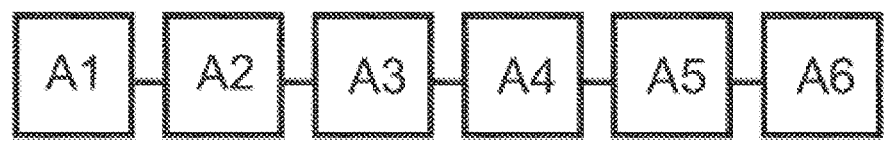
FIG. 2 represents schematically steps of a method for positioning underwater objects according to the invention.
Figure 3:
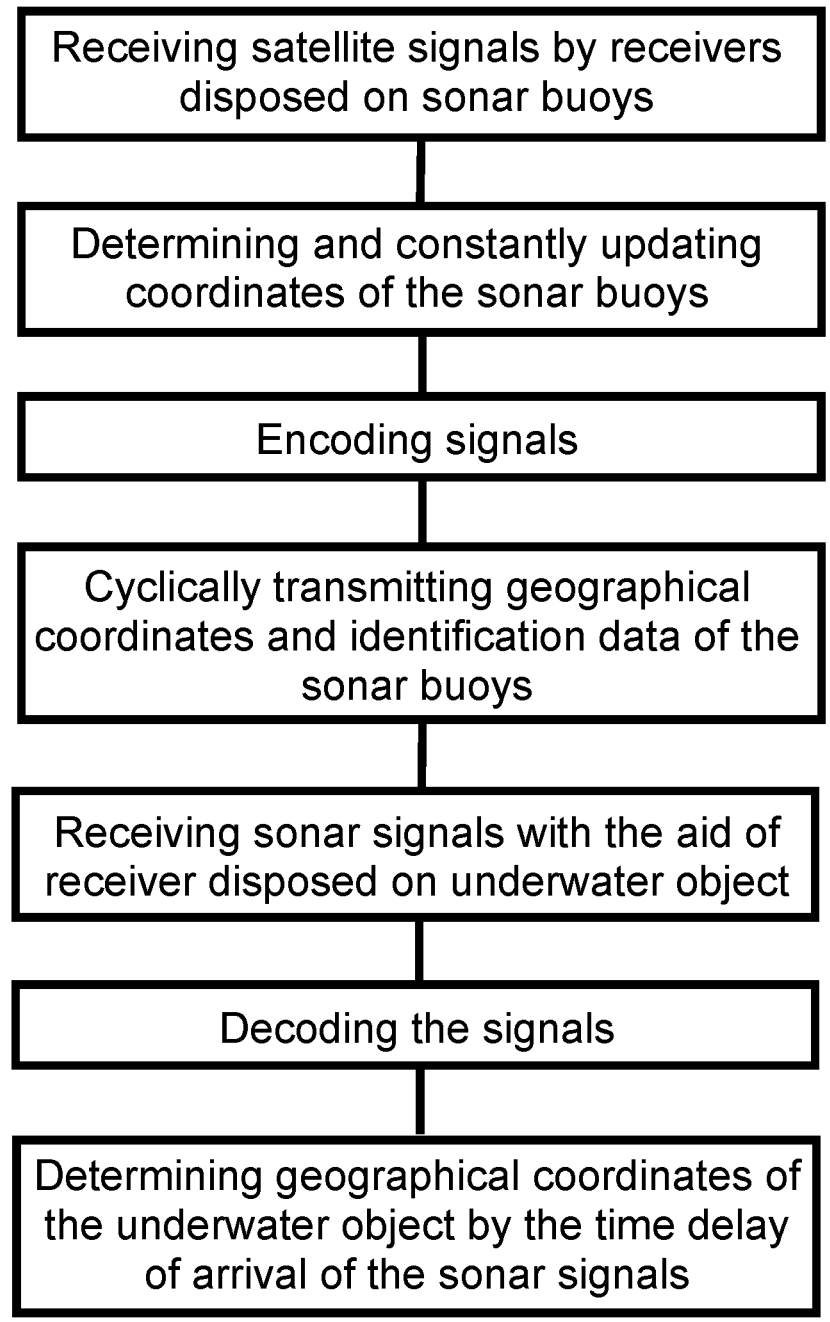
FIG. 3 represents schematically in details steps of a method for positioning underwater objects according to an embodiment of the invention.

According to the FIG. 2:

Phase A1. In advance, sonar buoys 1 are installed on a surface of the water, said buoys having a receiver 11 for satellite 2 signals, said receiver being connected to a computation module 12 of the sonar buoy, said module being connected to a transmitter 13 of sonar signal which comprise location data of the aforementioned sonar buoys 1 and their identification data. Each sonar buoy 1 is equipped with receivers 11 of a global satellite positioning system, said receivers being tethered to clocks which are synchronized with GPS/GLONASS. Considering that the sonar buoys 1 constantly update their coordinates, they may be floating or anchored.

Phase A2. All transmitters 13 of the sonar signals are installed at the same depth.

Phase A3. Considering that the clocks are accurately synchronized, the sonar buoys 1 cyclically transmit their geographical coordinates, simultaneously or in turn, at predetermined intervals of time, via a sonar channel, separated by encoding and/or time and/or frequency. At least four sonar buoys must be installed on the surface of the water for positioning of an underwater object 3.

Phase A4. A hyperbolic positioning method is employed, wherein any pair of sonar signals transmitters 13 having synchronized clocks allows to determine the location of the receiver 31 on a hyperbola using the time of arrival of the signals they emit, due to the fact that the geometrical location of the points (positions) of the receiver 31 showing a given value of difference between the time of arrival of the signal from two transmitters 13, takes a shape of hyperbola. At the same time, three nonrecurring pairs will allow to position the receiver 31 on a plane without error, and, as a result, to position the underwater object 3 connected to the same, having determined its location as an intersection of three hyperbolae.

Phase A5. Each sonar buoy 1 is assigned an identifier to allow the receiver 31 to distinguish it from others and to match its geographical coordinates with the time of arrival (TOA) of the signal from the identified sonar buoy. For example, the most effective system involves matched separation of the signals from sonar buoys by time and encoding, wherein sonar buoys analyze the data transmitted from built-in GPS/GLONASS receivers 11, said data comprising exact time and geographical coordinates. These buoys have synchronized clocks to emit positioning signals right at its own time. For example, the sonar buoy 1 emits the signal on the first second of the minute, the sonar buoy 2 emits the signal on the second of the minute, the sonar buoy 3 emits the signal on the third second, the sonar buoy 4 emits the signal on the fourth second, etc. If the system is so arranged, the positioning receiver 31 of the underwater object will be able to calculate its own location once every four seconds as it determines times of arrival from all four sonar buoys. Division by encoding allows to avoid interference of positioning signals from sonar buoys and enables the receiver 31 of the underwater object to distinguish between sonar buoys even is their mutual arrangement is so that, for example, signals from the sonar buoy 2 arrive earlier that those from the sonar buoy 1.

Phase A6. At the same time, signals from sonar buoys 1 are constantly received by the receiver 31 disposed on the underwater object 3 being positioned, said signals being demodulated and their times of arrival (TOA) registered, taking into account code division and/or time division of these signals and the fact that they were transmitted simultaneously or at known internals, and the fact that the coordinates of the sonar buoys are known.

Considering that the underwater object is equipped with a depth sensor connected to the positioning receiver, its own geographical coordinates it are calculated by the so-called time difference method using the computation module 32 of the underwater object and knowing its proper depth as well as at least four times of arrival from the points with known geographical coordinates. If the positioning signals from buoys are divided by time, the internal clock of the positioning receiver 31 is only required to be stable for a short time during which the signals from all sonar buoys are received.

The sequence of the phases is shown here by way of reference. Several phases may be switched, omitted, added or performed simultaneously without loss of ability to position underwater objects.

INDUSTRIAL APPLICABILITY

The claimed method and system for positioning underwater objects may be implemented by a person skilled in the art in practice and ensures that the claimed objectives are met after implementation, which leads to the conclusion that the invention meets the requirement of "industrial applicability".

According to the invention, an industrial prototype of the positioning system for underwater object was manufactured, comprising four sonar buoys and three positioning receivers. Tests were performed under the following system parameters:

sonar buoys were installed in the 500×500 meters area,
each receiver was manufactured as an individual device on a cable, said cable used to supply voltage to the device and facilitate the exchange of data,
the receivers were rigidly fixed on varying distances from the buoys (inside the defined area) and at varying depths, i.e. 3, 5 and 12 meters. The duration of the test was 2.5 hours,
the interval of positioning data update was 0.25 Hz (once every 4 seconds).

Testing location: Pichuga river estuary, Volgograd region. Maximum depth: 25 meters, sandy to silty bottom.

The tests of the industrial prototype of the system for positioning underwater objects demonstrated that it allows to:

accurately determine the coordinates of the underwater object, namely longitude and latitude using the incoming signals. Specifically, mean square deviation of the geographical position in meters was 0.48 meters for 3 positioning receivers operating non-stop for 2.5 hours,
evaluate the depth of the underwater object using a depth sensor,
position without the error from signal interference,
determine direct signals and avoid errors in positioning due to processing reflected signals.

All of the above serves to improve the accuracy of positioning underwater objects.

An additional useful technical result of the claimed invention is that it allows to:

position unlimited quantity of underwater objects at the same time,
operate the positioning receiver in passive mode only, without generating additional interference.

The technical result achieved by means of the above effects consists in improvement of accuracy of positioning underwater objects. Furthermore, the above advantages demonstrate that the embodiment of the claimed method and device is highly effective.

The invention claimed is:
1. A method for positioning underwater objects, comprising:
receiving satellite signals by first receivers disposed on a plurality of sonar buoys, the sonar buoys being unanchored and free floating on a surface of water,
determining coordinates of the sonar buoys by first computation modules of the sonar buoys,
transmitting geographical coordinates and identification data of the sonar buoys in the form of sonar signals emitted by transmitters of the sonar buoys, wherein all the transmitters of the sonar signals are installed at a same depth, receiving the sonar signals with the aid of a second receiver of the sonar signals, the second receiver being disposed on an underwater object, and determining geographical coordinates of the underwater object by a second computation module of the underwater object according to a time delay of receipt of the sonar signals from the sonar buoys, the location of which is known, the method further comprising:

encoding the signals emitted from each of the sonar buoys as periodic signals tethered to GPS/GLONASS clocks, decoding the signals received from the sonar buoys, wherein the decoding comprises isolating direct signals from the sonar buoys from reflected signals, constantly updating, by the sonar buoys, the respective current geographical coordinates of the sonar buoys, and cyclically transmitting in the encoded periodic signals tethered to GPS/GLONASS clocks the respective geographical coordinates of the sonar buoys via the respective transmitters of sonar signals to the second receiver, and determining, by the second computation module of the second receiver, the geographical coordinates of the underwater object by the time delay of arrival of the sonar signals from the unanchored free floating sonar buoys having constantly updated geographical coordinates.

2. The method according to claim 1, wherein during encoding the signals are divided by frequency and separated by time delay.

3. The method according to claim 1, wherein the second receiver of the sonar signals from the sonar buoys has a temperature compensated depth sensor.

4. The method according to claim 1, wherein four unanchored free floating sonar buoys are installed no farther than 1,500 meters away from each other.

5. The method according to claim 1, wherein the determining, by the second receiver, of the geographical coordinates of the underwater object is by the time delay of arrival of the sonar signals from four unanchored free floating sonar buoys having constantly updated geographical coordinates.

6. The method according to claim 1, comprising a third receiver of the sonar signals from the aforementioned sonar buoys, the third receiver being disposed on another underwater object and connected to a computation module of the other underwater object, the method further comprising:

determining, by the third computation module of the third receiver, geographical coordinates of the other underwater object by the time delay of arrival of the sonar signals from the unanchored free floating sonar buoys having constantly updated geographical coordinates.

7. A system for positioning underwater objects, said system comprising:

a plurality of sonar buoys, the sonar buoys being unanchored and free floating on a surface of water, each respective buoy having a first computation module, a transmitter of sonar signals, and a first receiver for satellite signals, the first receiver being connected to the first computation module, the module being connected to the transmitter of sonar signals, wherein the sonar signals comprise geographical coordinates and identification data of the aforementioned sonar buoys, wherein all the transmitters of the sonar signals are installed at a same depth, and a second receiver of the sonar signals from the aforementioned sonar buoys, the second receiver being disposed on an underwater object and connected to a second computation module of the underwater object, the second computation module being configured to determine the geographical coordinates of the underwater object by the time delay of arrival of the sonar signals from the sonar buoys, the location of which is known, wherein each respective sonar buoy comprises an encoding unit for encoding of signals, the encoding unit being connected to the first computation module and configured to generate an encoded periodic signal tethered to GPS/GLONASS clocks, and the second receiver of the sonar signals from the aforementioned sonar buoys comprises a decoding unit of signals received from the sonar buoys, the decoding unit being connected to a module for isolating direct signals of the sonar buoys from reflected signals and for registering the time of arrival of the direct signal only, the module for isolating direct signals of the sonar buoys from reflected signals is made as a rake receiver, the sonar buoys are configured to constantly update their respective current geographical coordinates and to cyclically transmit in the encoded periodic signals tethered to GPS/GLONASS clocks their respective geographical coordinates via the respective transmitters of sonar signals to the second receiver, and the second computation module of the second receiver is configured to determine geographical coordinates of the underwater object by the time delay of arrival of the sonar signals from the unanchored free floating sonar buoys having constantly updated geographical coordinates.

8. The system according to claim 7, wherein each encoding unit for encoding of signals is configured to generate periodic encoded signals which are divided by frequency and separated by time delay.

9. The system according to claim 7, wherein the second receiver of the sonar signals from the sonar buoys has a temperature compensated depth sensor.

10. The system according to claim 7, wherein four unanchored free floating sonar buoys are installed no farther than 1,500 meters away from each other.

11. The system according to claim 7, wherein the second computation module of the second receiver is configured to determine the geographical coordinates of the underwater object by the time delay of arrival of the sonar signals from four unanchored free floating sonar buoys having constantly updated geographical coordinates.

12. The system according to claim 7, comprising a third receiver of the sonar signals from the aforementioned sonar buoys, the third receiver being disposed on another underwater object and connected to a third computation module of the other underwater object, the third computation module being configured to determine geographical coordinates of the other underwater object by the time delay of arrival of the sonar signals from the sonar buoys, the location of which is known, wherein the third receiver of the sonar signals from the aforementioned sonar buoys comprises another decoding unit of signals received from the sonar buoys, the other decoding unit being connected to another module for isolating direct signals of the sonar buoys from reflected signals and for registering the time of arrival of the direct signal only, the other module for isolating direct signals of the sonar buoys from reflected signals is made as another rake receiver, and the third computation module of the third receiver is configured to determine the geographical coordinates of the other underwater object by the time delay of arrival of the sonar signals from the unanchored free floating sonar buoys having constantly updated geographical coordinates.

\* \* \* \* \*